(12) United States Patent
Harlan et al.

(10) Patent No.: US 8,724,320 B2
(45) Date of Patent: May 13, 2014

(54) FAN SYSTEM AND ELECTRONIC DEVICE

(75) Inventors: George Harlan, Braintree, MA (US); Masayuki Kato, Kyoto (JP); Hideyuki Takemoto, Kyoto (JP); Masamune Hiraki, Kyoto (JP)

(73) Assignee: Nidec Corporation, Kyoto (JP)

( * ) Notice: Subject to any disclaimer, the term of this patent is extended or adjusted under 35 U.S.C. 154(b) by 76 days.

(21) Appl. No.: 13/013,840

(22) Filed: Jan. 26, 2011

(65) Prior Publication Data

US 2012/0044644 A1  Feb. 23, 2012

Related U.S. Application Data

(60) Provisional application No. 61/375,123, filed on Aug. 19, 2010.

(51) Int. Cl.
*H05K 7/20* (2006.01)

(52) U.S. Cl.
USPC ...... 361/695; 361/679.48; 700/300; 700/304; 700/306; 417/2; 62/132; 713/400

(58) Field of Classification Search
USPC .................. 361/676–678, 679.46–679.48, 361/688–691, 694–695, 831
See application file for complete search history.

(56) References Cited

U.S. PATENT DOCUMENTS

| 4,500,821 | A  | * | 2/1985  | Bitting et al. ............ 318/400.05 |
| 6,398,505 | B1 | * | 6/2002  | Sekiguchi .......................... 417/2 |
| 6,654,894 | B2 | * | 11/2003 | Kaminski et al. ............. 713/300 |
| 7,613,002 | B2 | * | 11/2009 | Ye et al. ........................ 361/708 |
| 7,974,094 | B2 | * | 7/2011  | Hendrix et al. ................ 361/695 |
| 8,081,456 | B2 | * | 12/2011 | Iguchi ............................ 361/695 |
| 2006/0142901 | A1 | * | 6/2006 | Frankel et al. ................. 700/300 |
| 2008/0232974 | A1 | * | 9/2008 | Tsuchiya ......................... 417/14 |
| 2010/0028164 | A1 | * | 2/2010 | Matsui ............................... 417/2 |

FOREIGN PATENT DOCUMENTS

| CN | 1536232   | A | 10/2004 |
| JP | 09-264564 | A | 10/1997 |
| JP | 10-174487 | A | 6/1998  |

* cited by examiner

*Primary Examiner* — Courtney Smith
(74) *Attorney, Agent, or Firm* — Keating & Bennett, LLP (57) ABSTRACT

A fan system includes a pulse signal generation portion and a plurality of fans. Each of the plurality of fans preferably includes a motor portion; an impeller arranged to be rotated by the motor portion; a drive circuit arranged to drive the motor portion; a rotation detection portion arranged to detect rotation of the motor portion; and a rotation rate control circuit arranged to, based on a reference pulse signal supplied from the pulse signal generation portion and an actual rotation pulse signal supplied from the rotation detection portion, exercise feedback control on a rotation rate of the motor portion in accordance with a period of the reference pulse signal.

10 Claims, 8 Drawing Sheets

FAN SYSTEM AND ELECTRONIC DEVICE

BACKGROUND OF THE INVENTION

1. Field of the Invention

The present invention relates to a fan system including a plurality of fans, the fan system being preferably installed in an electronic device.

2. Description of the Related Art

A so-called fan tray, which includes an array of a large number of fans, is typically used in a large-scale communication device or router. In the fan tray, the rotation rates of the fans are controlled in accordance with the temperature of an interior of the device. Because there are a variety of PWM (Pulse Width Modulation) control apparatuses designated specifically for fans on the market, the control of the fans has often been performed through PWM. In PWM control, a PWM signal having a pulse width corresponding to the rotation rate of the fan is inputted to the fan. The PWM signal is generated in a control board provided in the fan tray. In the fan, the PWM signal is smoothed and converted into a DC voltage by an internal circuit. A microcomputer inside the fan performs feedback control on the rotation rate in accordance with the DC voltage.

Here, a smoothing circuit in each fan is made up of a capacitor and a resistor. The DC voltage outputted from the smoothing circuit slightly fluctuates as a result of fluctuation in characteristics of these elements. The fluctuation of the DC voltage results in fluctuation of the rotation rate of the fan. Moreover, characteristics of the smoothing circuits vary between different fans, and even if the plurality of fans are controlled to rotate in harmony at the same rotation rate, the fans do not operate in harmony due to the different fluctuations inherently provided by the capacitor and resistor of the smoothing circuits. Accordingly, beating sounds that are produced by the fluctuations in the rotation rates of the individual fans are increased due to variations in the rotation rates of the fans, to thereby result in an unusual beating sound which may be considered as a problematic noise.

JP-A 9-264564, for example, describes a method of reducing interference between noises produced by a plurality of fans. In the method of JP-A 9-264564, rotation rates of blowers are constantly changed in order to reduce beat sounds. This method, however, requires a complicated control process to be performed. Moreover, in the case where a large number of fans are caused to rotate, a period during which rotation rates of a plurality of fans are close to each other may occur, which still results in a beating noise.

SUMMARY OF THE INVENTION

In order to solve the above-described problems, fan systems according to preferred embodiments of the present invention include a pulse signal generation portion and a plurality of fans. Each of the plurality of fans preferably includes a motor portion; an impeller arranged to be rotated by the motor portion; a drive circuit arranged to drive the motor portion; a rotation detection portion arranged to detect a rotation of the motor portion; and a rotation rate control circuit arranged to, based on a reference pulse signal supplied from the pulse signal generation portion and an actual rotation pulse signal supplied from the rotation detection portion, exercise feedback control on a rotation rate of the motor portion in accordance with a period of the reference pulse signal. Thus, fan systems according to preferred embodiments of the present invention are able to achieve a reduction in noise or unusual sound, such as beat noise.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the present specification, the "rotation rate" of fans and motor portions refers to a number of rotations per unit time, and corresponds to a rotational speed.

First Preferred Embodiment

Figure 1:
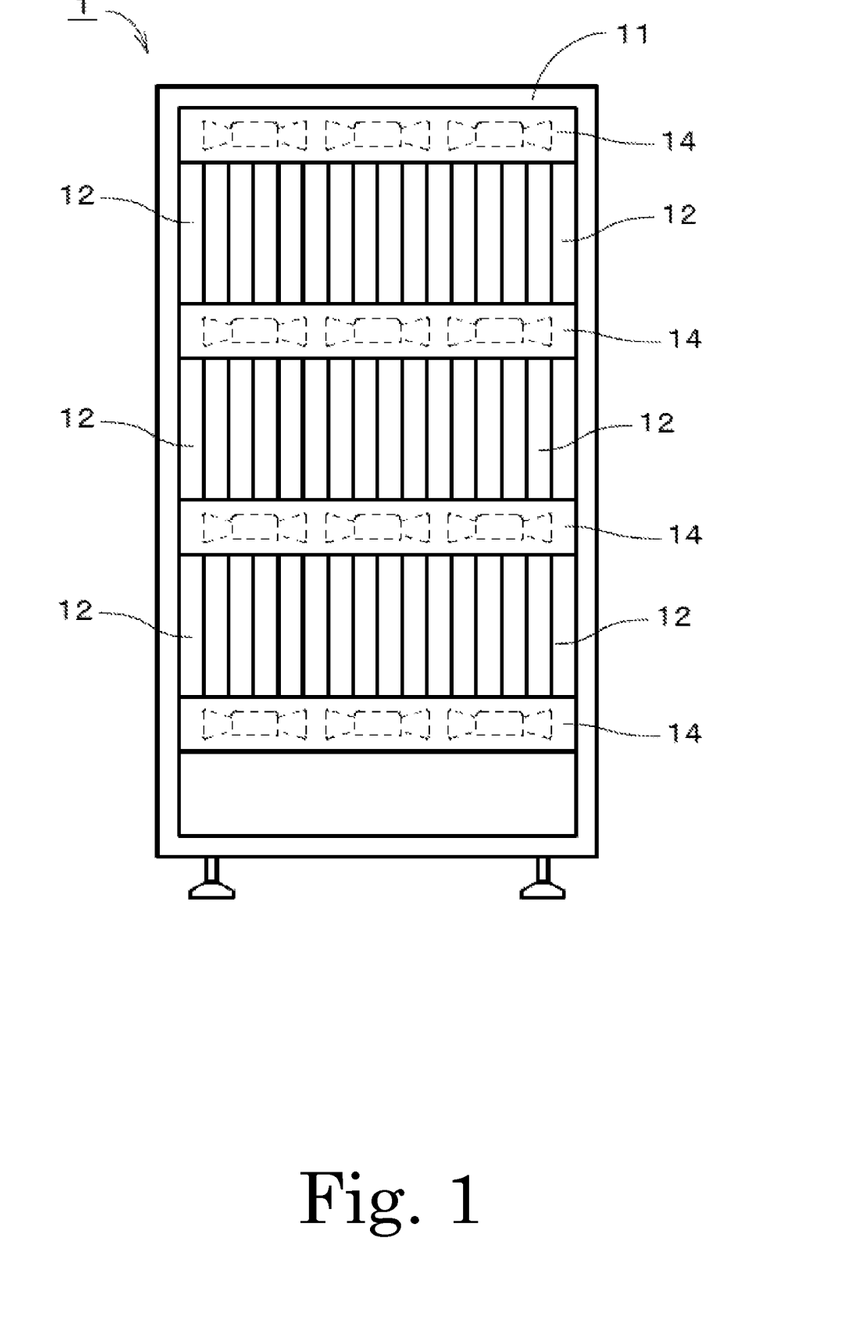
FIG. 1 is a front view of a rack-type electronic system according to a first preferred embodiment of the present invention.
Figure 2:
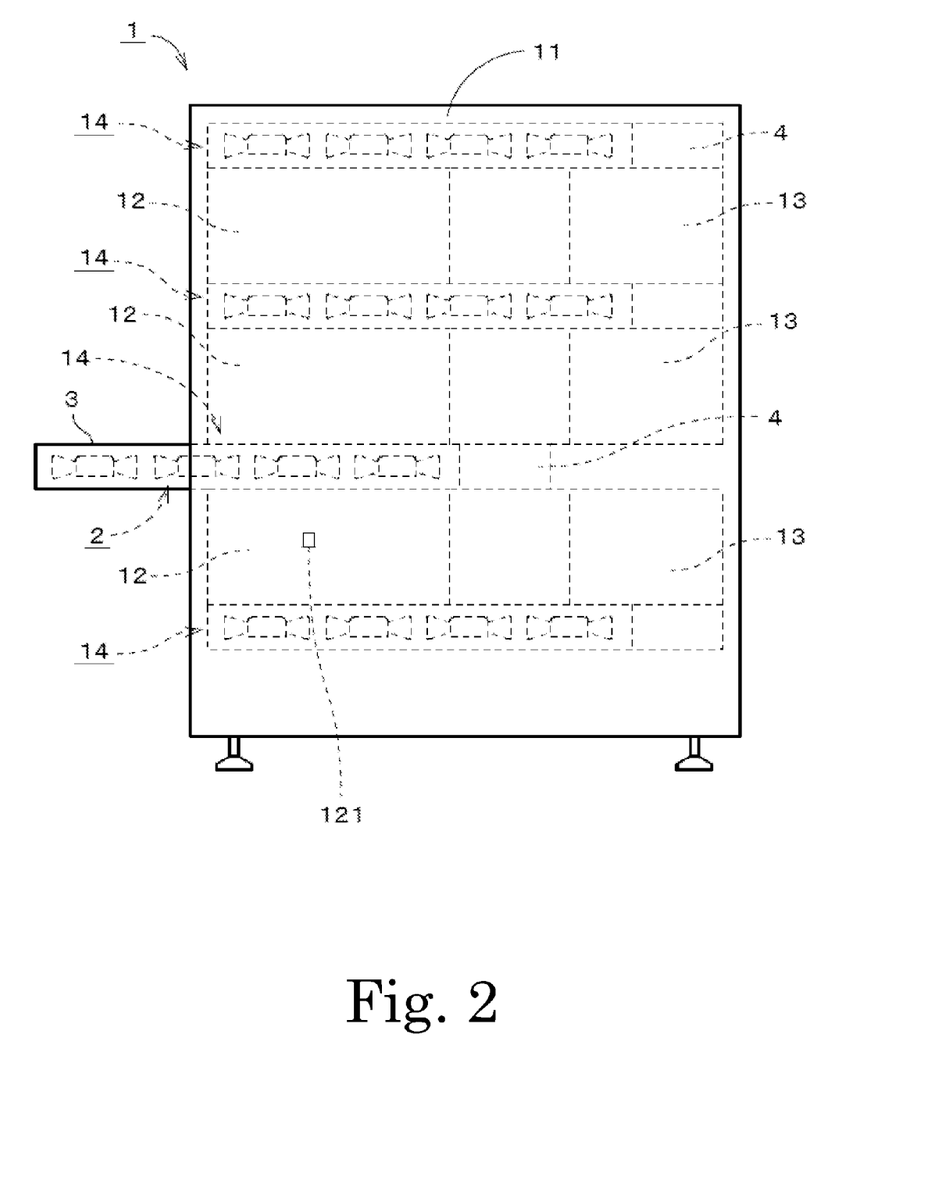
FIG. 2 is a right side view of the rack-type electronic system according to the first preferred embodiment of the present invention.

FIG. 1 is a front view illustrating a rack-type electronic system 1 according to an exemplary first preferred embodiment of the present invention. FIG. 2 is a right side view of the rack-type electronic system 1. The rack-type electronic system 1, which is typically an electronic device, preferably includes a case 11, a plurality of substantially plate-shaped blade servers 12, a plurality of power supply units 13, and four fan apparatuses 14. The blade servers 12 will be hereinafter referred to simply as the "servers 12".

The exterior of the case 11 is preferably in the shape of a rectangular parallelepiped. The case 11 is arranged to contain the plurality of servers 12, the plurality of power supply units 13, and the plurality of fan apparatuses 14. The case 11 has openings at a top and a bottom thereof. The servers 12 are arranged horizontally and oriented in an upright position. Arrays of the servers 12 are provided at three different vertical positions. As illustrated in FIG. 2, each power supply unit 13 is arranged behind a separate one of the arrays of the servers 12. The fan apparatuses 14 are arranged at four different positions above and below the arrays of the servers 12. The fan apparatuses 14 are arranged to produce flows of air around the servers 12, which are heat generating bodies.

Figure 3:
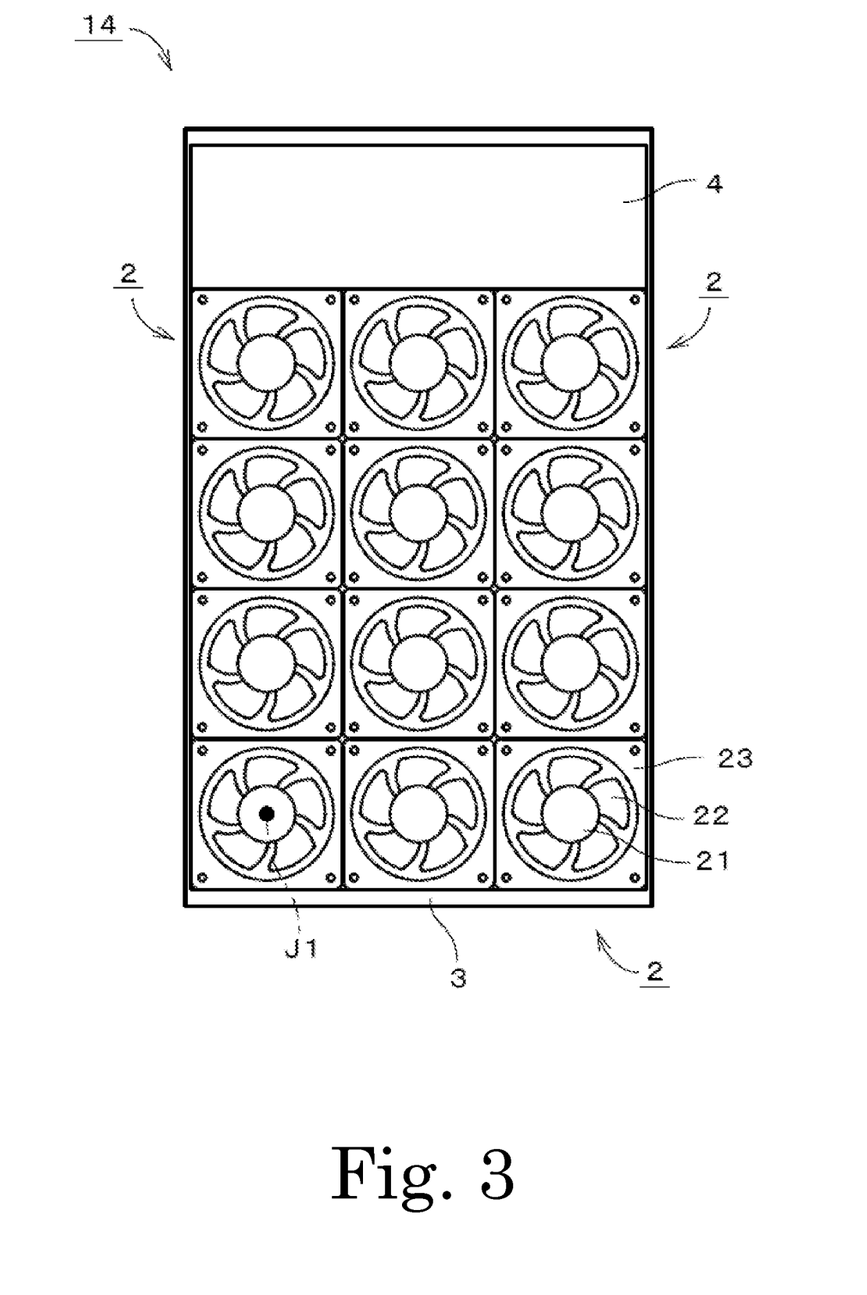
FIG. 3 is a plan view of a fan apparatus.

FIG. 3 is a plan view of the fan apparatus 14. In FIG. 3, a bottom side corresponds to a front of the case 11, while a top side corresponds to a rear of the case 11. The fan apparatus 14 is preferably a so-called fan tray, and includes a plurality of axial fans 2, a frame 3, and a pulse signal generation portion 4. Each axial fan 2 preferably includes a motor portion 21, an impeller 22, and a housing 23. The axial fans 2 will be hereinafter referred to simply as the "fans". The motor portion is arranged to rotate the impeller 22. The housing 23 is preferably arranged to surround an outer periphery of the impeller 22.

The housings 23 of the plurality of fans 2 are preferably arranged to be joined to one another. In the case where the frame 3 is regarded as a horizontal mounting surface for the fans 2 provided in the case 11, the plurality of fans 2 are arranged along the mounting surface, which is perpendicular or substantially perpendicular to rotation axes J1 thereof, perpendicularly to the rotation axes J1. In FIG. 3, the fans 2 are arranged in three columns, which are parallel to a horizontal direction in FIG. 2, and each column includes four of the fans 2.

As illustrated in FIG. 2, the frame 3 is capable of being horizontally inserted into and removed from the case 11 through the front of the case 11. This makes it easy to remove the fans 2 from the case 11 if it becomes necessary to repair any of the fans 2 or to replace any of the fans 2 with another fan 2. Note that, in FIG. 2, the second fan apparatus 14 from the bottom is illustrated as being slightly drawn out of the case 11.

The pulse signal generation portion 4, which is arranged to control rotation rates of the fans 2, is preferably arranged on an upper side of the fans 2 in FIG. 3, that is, to the right of the fans 2 in FIG. 2. The pulse signal generation portion 4 is attached to the frame 3 together with the fans 2. The pulse signal generation portion 4 includes a circuit board called a control board. On the control board, connectors connected to the fans 2, a connector arranged to receive signals from a thermometer 121 installed in the servers 12 as illustrated in FIG. 2, and so on are mounted. When the fan apparatus 14 has been inserted into the case 11, a connector in the pulse signal generation portion 4 and a connector provided on the case 11 are connected to each other, so that the pulse signal generation portion 4 and the servers 12 are electrically connected to each other.

Figure 4:
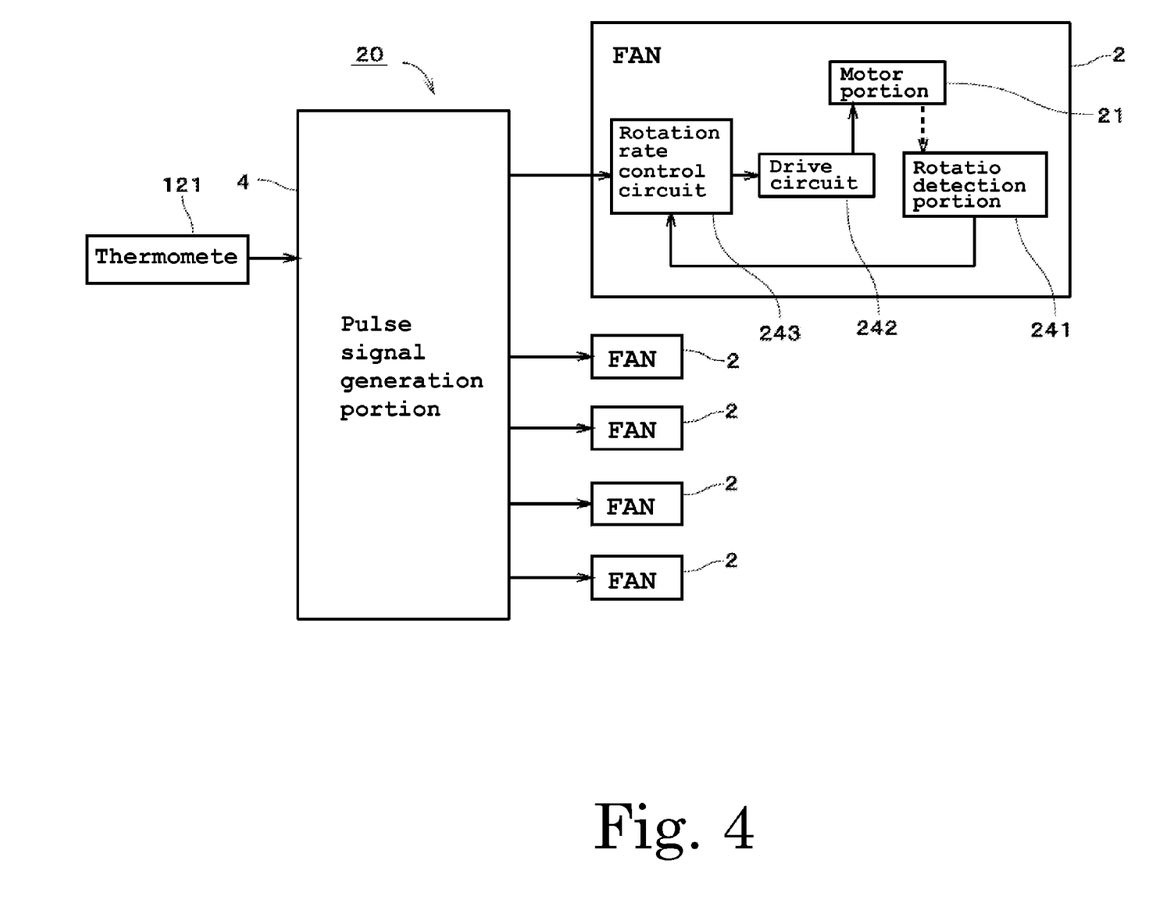
FIG. 4 is a block diagram illustrating the structure of a fan system.

FIG. 4 is a block diagram illustrating a manner in which the thermometer 121, the pulse signal generation portion 4, and the fans 2 are connected to one another. The plurality of fans 2 are connected to the pulse signal generation portion 4. The pulse signal generation portion 4 and the plurality of fans 2 together define a fan system 20 in which the plurality of fans 2 are controlled to rotate at basically the same rotation rate. A temperature signal as an external signal is supplied from the thermometer 121 to the pulse signal generation portion 4. In accordance with the temperature signal, the pulse signal generation portion 4 supplies, to each fan 2, a pulse signal in which the number of pulses per unit time is in proportion to the rotation rate of the fan 2. Specifically, the pulse signal generation portion 4 outputs a pulse signal having a short period when the temperature of the servers 12 is high, and outputs a pulse signal having a long period when the temperature is low. This arrangement causes the rotation rates of the fans 2 to increase when the temperature of the servers 12 is increased.

Each fan 2 includes a circuit board on which a rotation detection portion 241, a drive circuit 242, and a rotation rate control circuit 243 are arranged. The rotation rate control circuit 243 is preferably defined by a microcomputer mounted on the circuit board. The rotation detection portion 241 preferably includes Hall elements arranged to detect a magnetic field generated by a rotor magnet of the motor portion 21 to detect a rotational position of a rotor of the motor portion 21. Then, the rotation detection portion 241 supplies, to the rotation rate control circuit 243, a pulse signal which is in synchronization with the rotation. This pulse signal will be hereinafter referred to as an "actual rotation pulse signal". The drive circuit 242 is arranged to drive the motor portion 21. The rotor of the motor portion 21 is thereby caused to rotate together with the impeller 22. Note that, while the motor portion 21 illustrated in FIG. 4 corresponds to only the stator and the rotor, the rotation detection portion 241 and the drive circuit 242 may be considered as components of the motor portion.

The pulse signal from the pulse signal generation portion 4 is inputted to the rotation rate control circuit 243. This pulse signal will be hereinafter referred to as a "reference pulse signal". When the fan 2 is to be controlled to rotate at 3000 rpm, for example, a reference pulse signal having a frequency of 50 Hz (=3000 rpm/60) is inputted to the rotation rate control circuit 243. The rotation rate control circuit 243 outputs a drive signal to the drive circuit 242 so that a period of the actual rotation pulse signal will coincide with a period of the reference pulse signal. Specifically, when the period of the actual rotation pulse signal is longer than the period of the reference pulse signal, a drive signal for increasing the rotation rate is inputted to the drive circuit 242. When the period of the actual rotation pulse signal is shorter than the period of the reference pulse signal, a drive signal for reducing the rotation rate is inputted to the drive circuit 242.

In other words, based on the reference pulse signal and the actual rotation pulse signal, the rotation rate control circuit 243 exercises feedback control on the rotation rate of the motor portion 21 in accordance with the period of the reference pulse signal. As a result, the rotation rate of the motor portion 21 is controlled so that an actual frequency represented by the actual rotation pulse signal will correspond with a target frequency represented by the reference pulse signal.

Figure 5:
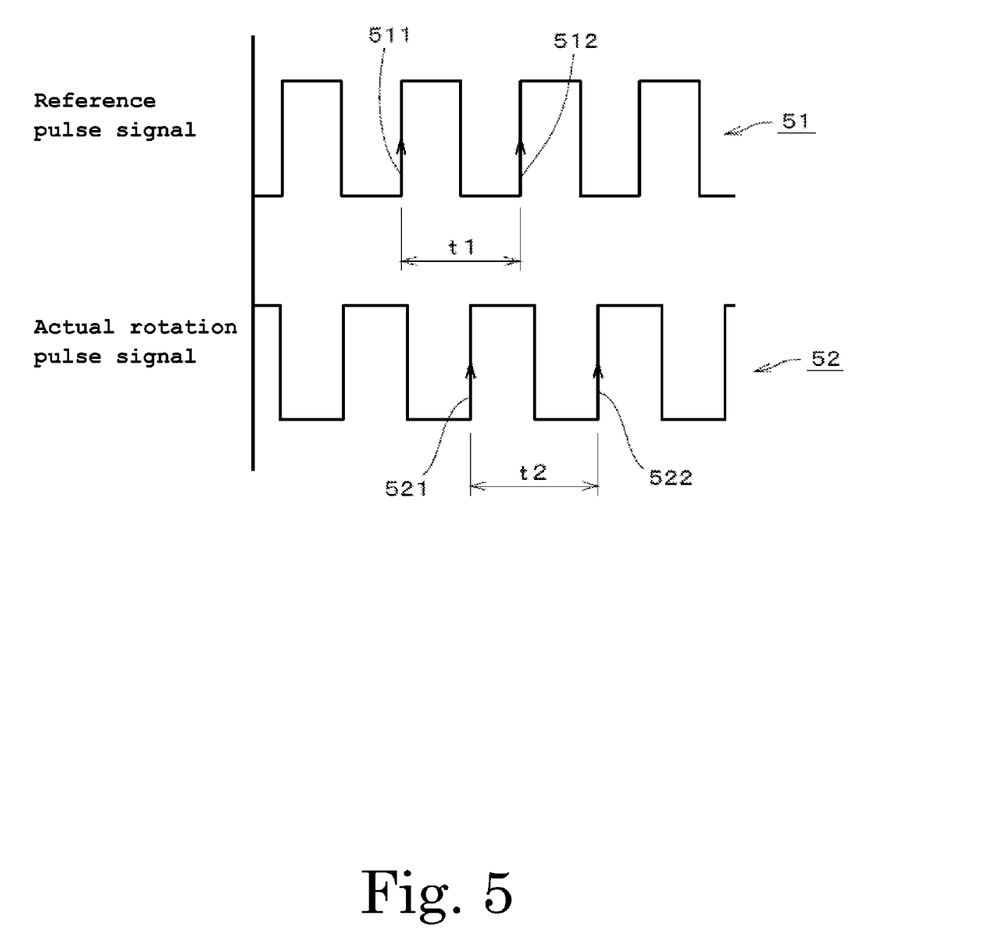
FIG. 5 is a diagram for explaining an outline of FLL control.

FLL (Frequency Locked Loop) control is used in the rotation rate control circuit 243. FIG. 5 is a diagram for explaining an outline of the FLL control. An upper half of FIG. 5 represents a reference pulse signal 51, while a lower half of FIG. 5 represents an actual rotation pulse signal 52. An oscillator is mounted on the circuit board provided in the fan 2. As the oscillator, a CR oscillator, a crystal oscillator, a ceramic oscillator, an oscillation element inside the microcomputer, or any other desirable oscillation element is preferably used. The rotation rate control circuit 243 detects rising edges, denoted by reference numerals "511" and "512", of the reference pulse signal 51. The rotation rate control circuit 243 counts the number of pulses from the oscillator during a period between the rising edges, and thereby obtains a time t1 between the rising edges. In a similar manner, the rotation rate control circuit 243 obtains a time t2 between rising edges, denoted by reference numerals "521" and "522", of the actual rotation pulse signal 52.

The rotation rate control circuit 243 calculates a difference between t1 and t2, and, in accordance with the difference, controls the pulse width of a pulse signal having a constant period which is included in the drive signal. Specifically, when t2 is shorter than t1, the pulse width of the drive signal is decreased, and the rotation rate is reduced. When t2 is longer than t1, the pulse width of the drive signal is increased, and the rotation rate is increased. For the control by the rotation rate control circuit 243, a variety of known feedback control methods, such as PID control, may be adopted.

The plurality of fans 2, to which reference pulse signals having the same period are supplied in response with a result of the FLL control, are caused to rotate at rotation rates corresponding to the reference pulse signals. As a result, all the fans 2 are caused to rotate at the same rotation rate in principle even though slight errors may occur due to variation between the microcomputers, ICs, or other factors, and generation of an unusual sound, such as a beating noise, can be prevented. Although the rotation rates of the fans 2 may temporarily fluctuate through influence of air flows inside the case 11, all the fans 2 are, in principle, controlled to rotate at basically the same rotation rate as a result of the feedback control. As described above, when the temperature of the servers is high, the periods of the reference pulse signals are shortened, and the rotation rates of all the fans 2 are equally increased. When the temperature of the servers 12 is low, the periods of the reference pulse signals are lengthened, and the rotation rates of all the fans 2 are equally reduced. Use of the above-described FLL control enables all the fans 2 to operate in exact harmony in accordance with the reference pulse signals, which change over time.

Note that, in the FLL control, other methods may be employed as a method of obtaining the difference in period. For example, control may be performed so that a difference in the number of pulses in a specified length of time between the reference pulse signal and the actual rotation pulse signal will be zero.

Figure 6:
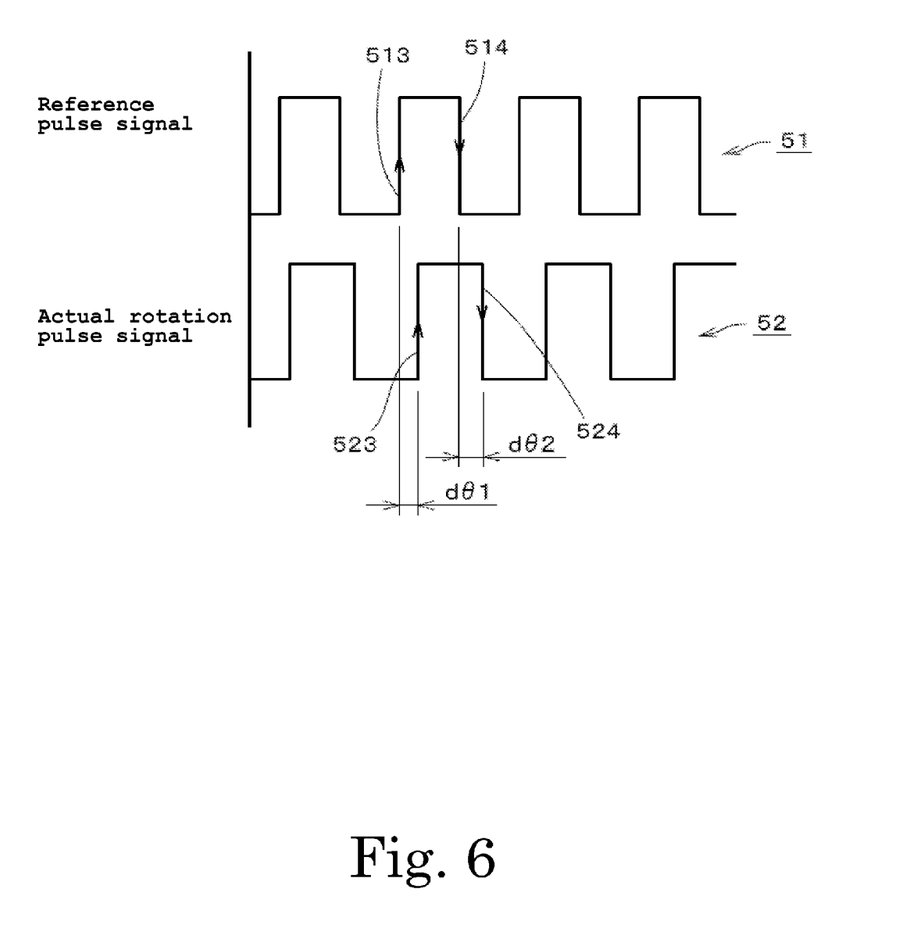
FIG. 6 is a diagram for explaining an outline of PLL control.

PLL (Phase Locked Loop) control may also be adopted for the control by the rotation rate control circuit 243 if so desired. FIG. 6 is a diagram for explaining an outline of the PLL control. In the PLL control, the rotation rate control circuit 243 detects a rising edge 513 and an immediately following falling edge 514 of the reference pulse signal 51, and also detects a corresponding rising edge 523 and an immediately following falling edge 524 of the actual rotation pulse signal 52. The rotation rate control portion 243 uses a high-frequency pulse signal supplied from the oscillator to obtain a time $d\theta1$ between the rising edge 513 and the rising edge 523 and a time $d\theta2$ between the falling edge 514 and the falling edge 524.

The rotation rate control circuit 243 controls the drive signal so that both $d\theta1$ and $d\theta2$ will be zero. As a result, the rotation of the fan 2 is controlled so that an actual rotation pulse signal 52 which is in phase with the reference pulse signal 51 will be outputted from the rotation detection portion 241. As a result, as in the case of the FLL control, the rotation rates of the plurality of fans 2 become equal, preventing generation of an unusual sound, such as a beat noise.

When the temperature of the servers 12 is high, the periods of the reference pulse signals are shortened, and the rotation rates of all the fans 2 are equally increased, whereas when the temperature of the servers 12 is low, the periods of the reference pulse signals are lengthened, and the rotation rates of all the fans 2 are equally reduced.

Also for the PLL control, a variety of methods may be adopted. For example, it may be so arranged that only $d\theta1$ is obtained, and control is performed so that $d\theta1$ will be zero. Also, it may be so arranged that middle points in time between rising and falling edges are obtained, and control is performed so that the middle points in the reference pulse signal 51 and the middle points in the actual rotation pulse signal 52 will coincide with each other.

Second Preferred Embodiment

Figure 7:
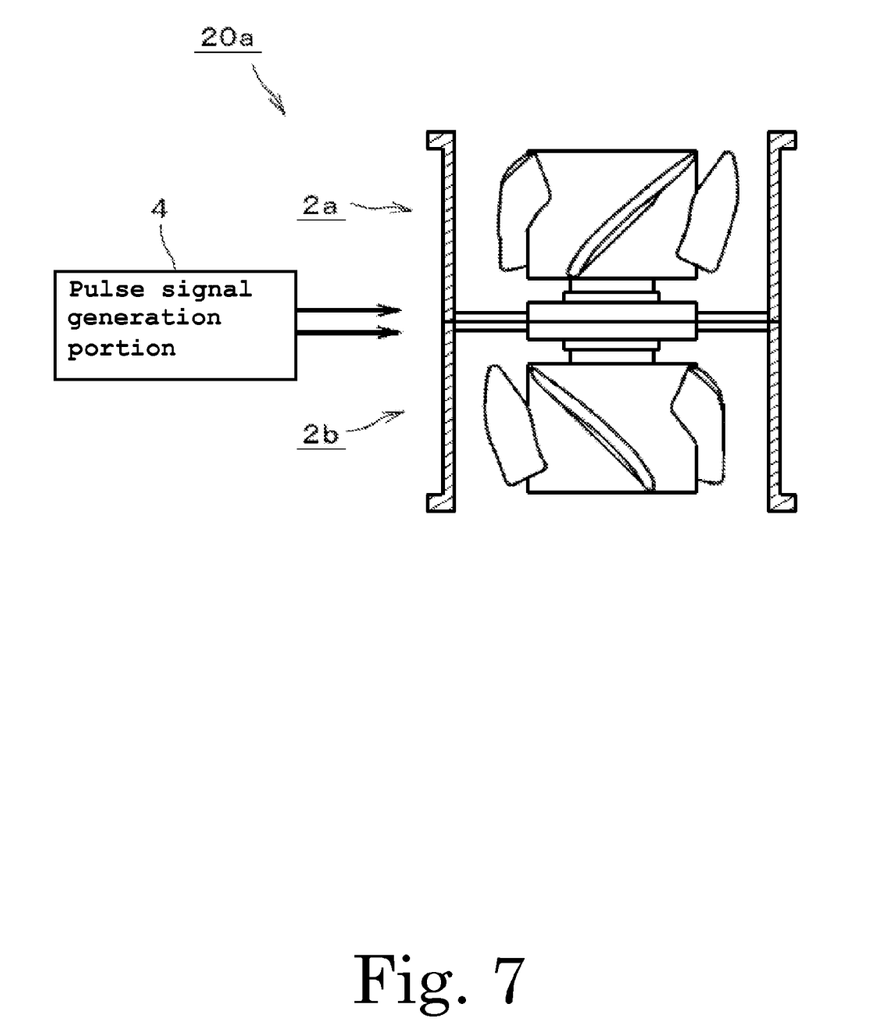
FIG. 7 is a diagram illustrating a fan system according to a second preferred embodiment of the present invention.

FIG. 7 is a diagram illustrating a fan system 20a according to an exemplary second preferred embodiment of the present invention. The fan system 20a includes a first fan 2a, a second fan 2b, and the pulse signal generation portion 4. The first fan 2a and the second fan 2b are axial fans, and they are arranged such that central axes thereof coincide with each other. The first fan 2a and the second fan 2b together define a so-called counter-rotating axial fan.

The basic structure of each of the first fan 2a and the second fan 2b is similar to that of the fan illustrated in FIG. 4. That is, the FLL control is performed by the rotation detection portion 241, the drive circuit 242, and the rotation rate control circuit 243. The reference pulse signals are supplied from the pulse signal generation portion 4 to the first fan 2a and the second fan 2b separately. Reference pulse signals having the same period may be inputted to both the fans 2a and 2b, or alternatively, reference pulse signals having different periods may be inputted to the fans 2a and 2b. The fans 2a and 2b are controlled to rotate at accurate rotation rates in accordance with the respective reference pulse signals.

The rotation rates of the first fan 2a and the second fan 2b are determined based on a result of a prior noise measurement. This leads to a reduction in noise or unusual sound, such as a beating noise, which is generated by interference between wind noises from the fans 2a and 2b. Note that the reference pulse signals may be changed over time so that the rotation rates of the fans will be changed accordingly. In this case, optimum rotation rates of the second fan 2b are previously determined for a variety of different rotation rates of the first fan 2a.

Third Preferred Embodiment

Figure 8:
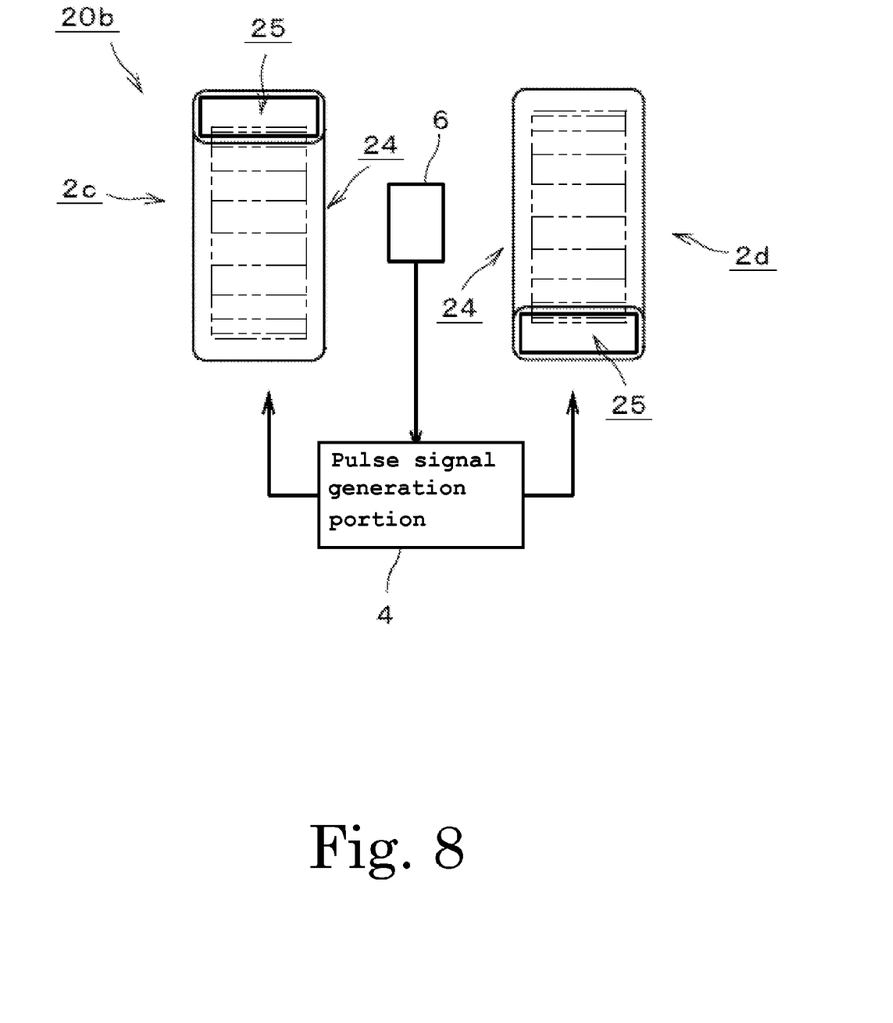
FIG. 8 is a diagram illustrating a fan system according to a third preferred embodiment of the present invention.

FIG. 8 is a diagram illustrating a fan system 20b according to an exemplary third preferred embodiment of the present invention. The fan system 20b includes a first fan 2c, a second fan 2d, and the pulse signal generation portion 4. The first fan 2c and the second fan 2d are centrifugal fans, and they are arranged such that central axes thereof coincide with each other, and that they are horizontally spaced from each other.

A heat generating body 6, such as, for example, a CPU, is placed between the first fan 2c and the second fan 2d. The first fan 2c is arranged to take in air through an opening 24, the air traveling along the central axis leftward in FIG. 8, so that the air will be discharged by an impeller through an opening 25 in a direction perpendicular or substantially perpendicular to the central axis. The second fan 2d is arranged to take in air through an opening 24, the air traveling along the central axis rightward in FIG. 8, so that the air will be discharged by an impeller through an opening 25 in a direction perpendicular or substantially perpendicular to the central axis. The fans 2c and 2d together generate a flow of air to discharge heat radiating from the heat generating body 6 to a surrounding of the heat generating body 6.

The basic structures and control of the first fan 2c and the second fan 2d are similar to those of the fans according to the second preferred embodiment, except that the first fan 2c and the second fan 2d are centrifugal fans. The rotation rate of the first fan 2c and the rotation rate of the second fan 2d are controlled to exactly coincide with each other, to achieve a reduction in the unusual sound, such as a beating noise. In addition, a temperature signal is supplied from a thermometer provided in the heat generating body 6 to the pulse signal generation portion 4, and when the temperature of the heat generating body 6 is increased, the rotation rates of the fans are equally increased.

Note that the present invention is not limited to the above-described preferred embodiments, but that a variety of variations and modifications are possible. For example, the fans are not limited to the axial fans or the centrifugal fans, but the present invention is also applicable to various other types of fans. Also note that the arrangement of the plurality of fans may be modified in a variety of manners.

Also note that the pulse signal generation portion 4 may not necessarily be arranged on a single circuit board, but that it may be so arranged, for example, that a separate circuit board is provided for each fan, and the plurality of circuit boards are electrically connected to one another to define the pulse signal generation portion 4. Also note that the rotation rate control circuit 243 may be arranged outside of the fan. For example, the rotation rate control circuit 243 may be arranged at the same location as the pulse signal generation portion 4.

Also note that the rotation detection portion 241 may not necessarily include a Hall element. A frequency generator (or "FG") pattern or other desirable methods may be used to detect the rotation. Also note that one pulse of the actual rotation pulse signal may not necessarily correspond to one rotation of the motor portion 21, and that a plurality of pulses may be outputted during one rotation of the motor portion 21. The rotation rate of the fan, i.e., the rotation rate of the impeller 22, is in principle equal to the rotation rate of the rotor of the motor portion 21. Note, however, that in the case where the impeller 22 is not directly joined to the motor portion 21, but joined thereto through a speed reducer or the like, the rotation rate of the impeller 22 does not coincide with the rotation rate of the motor portion 21. In this case, the actual rotation pulse signal may represent either the rotation rate of the impeller 22 or the rotation rate of the motor portion 21. In either case, the rotation rate of the motor portion 21 is in essence inputted to the rotation rate control circuit 243.

Also note that the external signal inputted to the pulse signal generation portion 4 may not necessarily be a signal representing the temperature of the servers 12, the heat generating body 6, or the like, as long as the external signal is supplied from a device to which the plurality of fans are attached. For example, an external signal representing the computation amount of a processor, such as a CPU, or an external signal representing the number of servers 12 which are in operation, may be inputted to the pulse signal generation portion 4. Also note that the thermometer may be arranged to measure the temperature of the surrounding of the heat generating body.

The fan systems as described above with reference to the above-described preferred embodiments are usable in a variety of fan systems in which a plurality of fans are arranged adjacent or close to one another, and are, in particular, preferably used in a server system, a communication system, a router, or the like in which a large number of fans are used.

While preferred embodiments of the present invention have been described above, it is to be understood that variations and modifications will be apparent to those skilled in the art without departing from the scope and spirit of the present invention. The scope of the present invention is therefore to be determined solely by the following claims.

What is claimed is:

1. A fan system comprising:
   a pulse signal generation portion; and
   a plurality of fans; wherein
   each of the plurality of fans includes:
     a motor portion;
     an impeller arranged to be rotated by the motor portion;
     a drive circuit arranged to drive the motor portion;
     a rotation detection portion arranged to detect rotation of the motor portion;
   and
     a rotation rate control circuit arranged to, based on a reference pulse signal supplied from the pulse signal generation portion and an actual rotation pulse signal supplied from the rotation detection portion, perform feedback control on a rotation rate of the motor portion in accordance with a period of the reference pulse signal;
   the rotation rate control circuits perform the feedback control on the rotation rates of the motor portions based on a time difference between rising edges of the reference pulse signal and rising edges of the actual rotation pulse signal; and
   the pulse signal generation portion is arranged to change the period of the reference pulse signal and arranged to transmit the reference pulse signal to each of the plurality of fans in order to change the rotation rates of the motor portions.

2. The fan system according to claim 1, wherein
   the pulse signal generation portion is arranged to receive an external signal from a device to which the plurality of fans are attached; and
   the pulse signal generation portion is arranged to change the period of the reference pulse signal in accordance with the external signal.

3. The fan system according to claim 1, wherein
   the plurality of fans are axial fans; and
   the plurality of fans are arranged perpendicularly or substantially perpendicularly relative to rotation axes thereof.

4. The fan system according to claim 3, wherein the pulse signal generation portion and the plurality of fans are attached to a single frame.

5. The fan system according to claim 1, wherein the rotation rate control circuit is arranged to control the rotation rate of the motor portion by Frequency Locked Loop control.

6. An electronic device comprising:
   a heat generating body;
   a pulse signal generation portion; and
   a plurality of fans arranged to generate a flow of air around the heat generating body; wherein
   each of the plurality of fans includes:
     a motor portion;
     an impeller arranged to be rotated by the motor portion;
     a drive circuit arranged to drive the motor portion;
     a rotation detection portion arranged to detect rotation of the motor portion;
   and
     a rotation rate control circuit arranged to, based on a reference pulse signal supplied from the pulse signal generation portion and an actual rotation pulse signal supplied from the rotation detection portion, perform feedback control on a rotation rate of the motor portion in accordance with a period of the reference pulse signal; and
   the rotation rate control circuits perform the feedback control on the rotation rates of the motor portions based on a time difference between rising edges of the reference pulse signal and rising edges of the actual rotation pulse signal; and
   the pulse signal generation portion is arranged to change the period of the reference pulse signal and arranged to transmit the reference pulse signal to each of the plurality of fans in order to change the rotation rates of the motor portions.

7. The electronic device according to claim 6, further comprising a thermometer arranged to measure a temperature of the heat generating body or a surrounding region thereof; wherein
   the reference pulse signal inputted to each of the plurality of fans has the same period; and
   the pulse signal generation portion is arranged to change the period of the reference pulse signal in accordance with a temperature signal supplied from the thermometer.

8. The electronic device according to claim 7, wherein
   the plurality of fans are axial fans;
   the plurality of fans are arranged perpendicularly or substantially perpendicularly to rotation axes thereof; and
   the pulse signal generation portion and the plurality of fans are attached to a single frame.

9. The electronic device according to claim 6, further comprising:
   a first group of the plurality of fans; and
   a second group of the plurality of fans; wherein the first group of the plurality of fans is arranged above the heat generating body and the second group of the plurality of fans is arranged below the heat generating body.

10. The fan system according to claim 1, further comprising:
a heat generating body;
a first group of the plurality of fans; and
a second group of the plurality of fans; wherein
the plurality of fans are arranged to generate a flow of air around the heat generating body; and
the first group of the plurality of fans is arranged above the heat generating body and the second group of the plurality of fans is arranged below the heat generating body.

* * * * *